US012609990B2

(12) United States Patent
Smith et al.

(10) Patent No.: US 12,609,990 B2
(45) Date of Patent: Apr. 21, 2026

(54) SYSTEMS AND METHODS FOR PROVIDING SECURE PORTALS BETWEEN VIRTUAL WORLDS

(71) Applicant: CEO Vision, Inc, Cary, NC (US)

(72) Inventors: David A. Smith, Cary, NC (US); Aran Lunzer, Los Angeles, CA (US); Vanessa Ada Freudenberg, Los Angeles, CA (US); Brian Upton, Los Angeles, CA (US); Yoshiki Ohshima, Valley Village, CA (US)

(73) Assignee: CEO Vision, Inc, Cary, NC (US)

( * ) Notice: Subject to any disclaimer, the term of this patent is extended or adjusted under 35 U.S.C. 154(b) by 427 days.

(21) Appl. No.: 18/174,587

(22) Filed: Feb. 24, 2023

(65) Prior Publication Data

US 2023/0319144 A1 Oct. 5, 2023

Related U.S. Application Data

(60) Provisional application No. 63/315,029, filed on Feb. 28, 2022.

(51) Int. Cl.
| | |
|---|---|
| *G06T 15/00* | (2011.01) |
| *G06T 19/00* | (2011.01) |
| *H04L 67/131* | (2022.01) |

(52) U.S. Cl.
CPC .......... H04L 67/131 (2022.05); G06T 15/005 (2013.01); G06T 19/003 (2013.01); *G06T 2207/20221* (2013.01)

(58) Field of Classification Search
None
See application file for complete search history.

(56) References Cited

U.S. PATENT DOCUMENTS

| | | | | |
|---|---|---|---|---|
| 12,051,170 B2 * | 7/2024 | Schmidtchen | ........ | G06T 19/003 |
| 12,266,061 B2 * | 4/2025 | Krenn | ..................... | G06F 3/011 |

(Continued)

OTHER PUBLICATIONS

ISA/US, "Notification of Transmittal of the ISR and the Written Opinion of the International Searching Authority, or the Declaration," in PCT Application No. PCT/US2023/013909 dated Jun. 6, 2023, 8 pages.

(Continued)

*Primary Examiner* — Paul A D'Agostino
(74) *Attorney, Agent, or Firm* — IP Strategy Consulting

(57) ABSTRACT

Systems and methods for secure portals between virtual worlds are provided. In some embodiments, the systems and methods include deploying a secure portal between two virtual worlds. This is performed by rendering a top cell for a first virtual world. Rendering includes a transparent region overlapping a portal. Then an intermediate cell is layered underneath the top cell. This intermediate cell comprises the portal. A message is received from the top cell. The message includes a minimum rendering size, shape and at least one transform. This message is transferred to a bottom cell for a second virtual world, where it is rendered (in part) responsive to the message. The top cell, the intermediate cell and the bottom cell are then layered to generate a scene. In some embodiments, the rendered portion of the bottom cell comports to the minimum rendering size, and the intermediate cell is transparent. In some cases, the cells are either iFrames, or separate applications.

20 Claims, 18 Drawing Sheets

100

(56) References Cited

U.S. PATENT DOCUMENTS

| | | | |
|---|---|---|---|
| 2008/0077862 A1 | 3/2008 | Tolpin | |
| 2008/0124687 A1* | 5/2008 | Post | G09B 19/00 |
| | | | 434/219 |
| 2008/0134056 A1* | 6/2008 | Shuster | A63F 13/12 |
| | | | 715/757 |
| 2009/0260005 A1* | 10/2009 | Nakagawa | H04L 67/34 |
| | | | 717/177 |
| 2010/0171759 A1 | 7/2010 | Nickolov et al. | |
| 2013/0057561 A1* | 3/2013 | Nave | G06F 9/542 |
| | | | 345/522 |
| 2020/0289935 A1* | 9/2020 | Azmandian | G06F 3/04815 |
| 2020/0334893 A1* | 10/2020 | Jiang | G06T 19/00 |
| 2020/0351537 A1* | 11/2020 | Browy | H04W 4/021 |
| 2020/0388070 A1* | 12/2020 | Jiang | A63F 13/52 |
| 2021/0308576 A1* | 10/2021 | Upton | A63F 13/573 |
| 2023/0137613 A1* | 5/2023 | Lai | G06Q 30/0207 |
| | | | 345/419 |
| 2023/0169578 A1* | 6/2023 | Krishna | G06Q 30/0625 |
| | | | 705/27.1 |
| 2023/0199161 A1* | 6/2023 | Ni | G06F 3/011 |
| | | | 348/51 |
| 2023/0205781 A1* | 6/2023 | Bharadwaj | G06F 16/3331 |
| | | | 707/603 |
| 2023/0319144 A1* | 10/2023 | Smith | G06F 3/04815 |
| | | | 463/42 |
| 2023/0421448 A1* | 12/2023 | Cui | H04L 41/12 |
| 2023/0421646 A1* | 12/2023 | Cui | H04L 67/131 |
| 2024/0020937 A1* | 1/2024 | Shirai | G06T 19/20 |
| 2024/0070627 A1* | 2/2024 | Galterio | G06Q 20/36 |
| 2024/0112409 A1* | 4/2024 | Cross | G06F 3/011 |
| 2024/0160272 A1* | 5/2024 | Soryal | G06F 3/011 |
| 2024/0177441 A1* | 5/2024 | Benzies | G06T 19/003 |
| 2024/0211909 A1* | 6/2024 | Lal | G06N 20/00 |
| 2024/0329731 A1* | 10/2024 | Magi | G06F 3/011 |
| 2024/0357186 A1* | 10/2024 | Rey | G06F 21/10 |
| 2025/0097349 A1* | 3/2025 | Nitidharmatut | G06N 20/00 |
| 2025/0099859 A1* | 3/2025 | Muhammad | A63F 13/69 |

OTHER PUBLICATIONS

Dickey, "Brave new (interactive) worlds: A review of the design affordances and constraints of two 3D virtual worlds as interactive learning environments." Interactive learning environments 13.1-2 (2005): 121-137. Retrieved on Apr. 22, 2023 (Apr. 22, 2023) from <https://www.tandfonline.com/doi/abs/10.1080/10494820500173714> entire document.

* cited by examiner

200

300

310

320

330

400

1000A
430
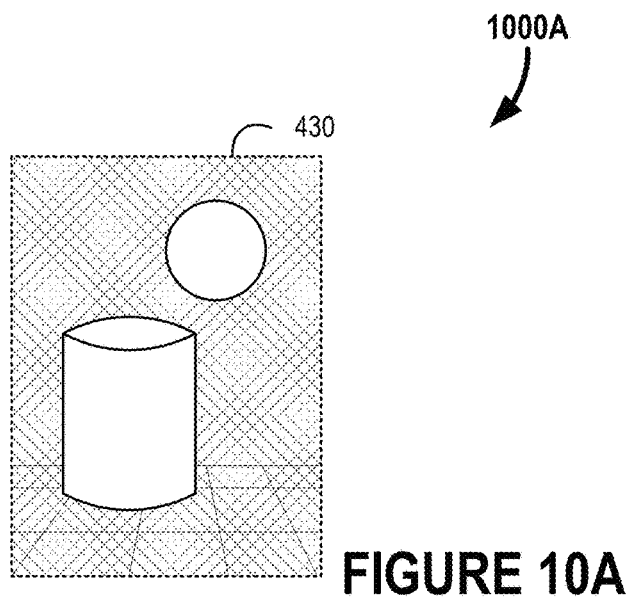
FIGURE 10A
1000B
430
1000C
430
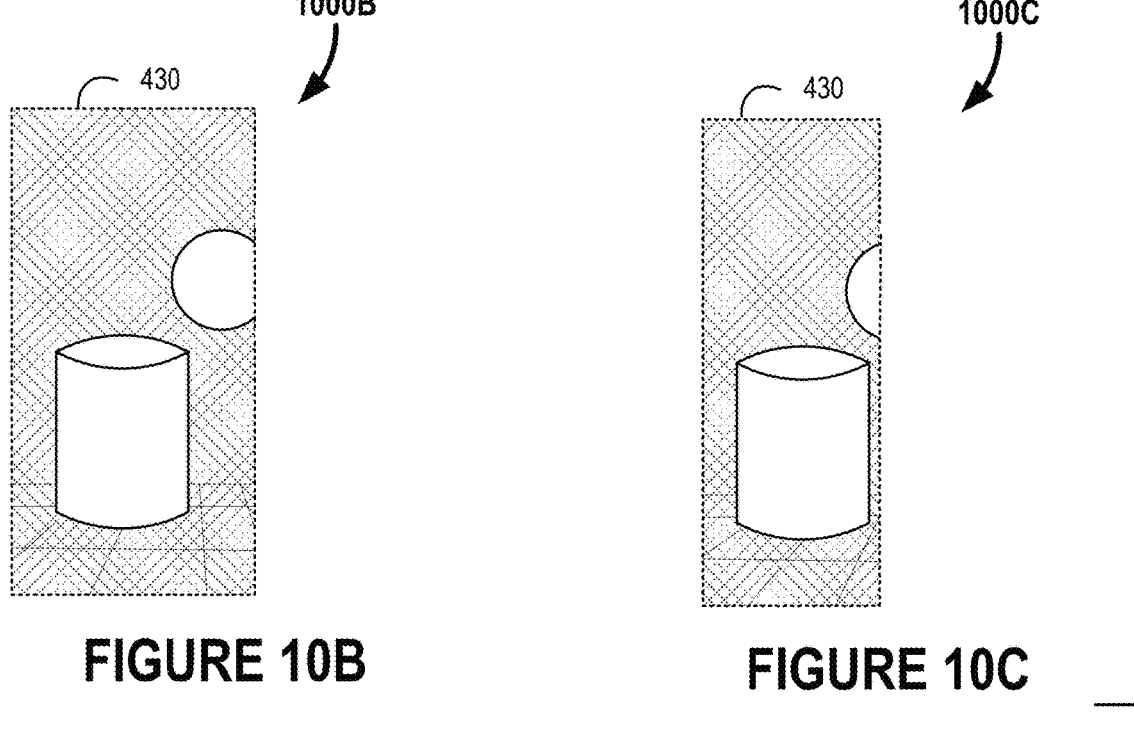
FIGURE 10B          ## FIGURE 10C

1300

1210

1400

Start

1410

RENDER EACH WORLD AS A SEPARATE CELL

1420

RENDER TRANSPARENT PORTAL CELL

1430

TOP CELL SENDS MESSAGE TO PORTAL CELL
UNDERNEATH IT

1440

LOWER CELL RENDERS THE SCENE

1450

USER INTERACTION WITH PORTAL

Stop

1430

From 1420

1510
SPECIFY MINIMAL SIZED RENDERING THAT OVERLAPS THE PORTAL

1520
SPECIFY TRANSFORM FOR THE LOWER CELL

To 1440

1450

From 1440

1610
USER CLICKS ON PORTAL OR WALKS THROUGH IT

1620
REORDER CELLS

1630
SPECIFY SIZE AND TRANSFORMS OF CELLS

1640
RE-RENDER CELLS

Stop

SYSTEMS AND METHODS FOR PROVIDING SECURE PORTALS BETWEEN VIRTUAL WORLDS

CROSS REFERENCE TO RELATED APPLICATION

This non-provisional application claims the benefit of provisional application No. 63/315,029, filed Feb. 28, 2022, same title, which application is incorporated herein in its entirety by this reference.

BACKGROUND

The present invention relates to systems and methods for secure portals between virtual worlds. Such systems and methods enable virtual spaces from different sandboxes, and even different applications, to have connectivity with one another in a secure manner.

Portals are known entities in Metaverse spaces. Traditionally, a portal joins two virtual spaces together, and even allows interactions through the portal. These portals act as the equivalent to a URL link in a web page—except they are dynamically loaded and active. As such, users can visualize into/through the portal before interacting with it.

When the portal is between two spaces within the same world/application, the method of deploying a portal may be trivial. However, when trying to connect differing sandboxes, or even harder, different applications entirely, the task of deploying portals becomes more complicated.

A significant complication to the deployment of these portals is that, traditionally, the portal is deployed in each virtual world in the same code space as the world itself. This opens a huge security risk to the virtual world, as the portal may include malicious code. As such, portal deployment is extremely risky, or alternatively, very restricted to select known worlds that have been whitelisted.

In addition to the issues of security, liking two different "kinds" of spaces is equally difficult. It generally requires each world to load the other world's portal's link code. When the two worlds have a shared environment, this may not be an issue. However, most worlds do not have the same model of rendering and interactions, thus making portals between these worlds a non-trivial task. It requires the simultaneous viewing and engagement with various applications with very different rendering technologies and underlying system code. This may simply be impossible in some cases, and a significant expenditure of resources to complete, when it's even possible.

Regardless of the hurdles, the Metaverse is an evolving and dynamic space. As time progresses it will become more and more ingrained in our everyday lives. The need and desire to portal between different virtual spaces will only increase.

It is therefore apparent that an urgent need exists for a new architecture that allows for secure portals between different virtual spaces. Such systems and methods enable users to travel between different virtual spaces seamlessly, and without the introduction of security loopholes introduced into the worlds being connected to one another.

SUMMARY

To achieve the foregoing and in accordance with the present invention, systems and methods for secure portals between virtual worlds are provided. Such systems and methods enable a means for users to travel between two different virtual spaces without the introduction of security loopholes into the worlds being coupled to one another.

In some embodiments, the systems and methods include deploying a secure portal between two virtual worlds. This is performed by rendering a top cell for a first virtual world. Rendering includes a transparent region overlapping a portal. Then an intermediate cell is layered underneath the top cell. This intermediate cell comprises the portal. A message is received from the top cell. The message includes a minimum rendering size, shape and at least one transform. This message is transferred to a bottom cell for a second virtual world, where it is rendered (in part) responsive to the message. The top cell, the intermediate cell and the bottom cell are then layered to generate a scene. In some embodiments, the rendered portion of the bottom cell comports to the minimum rendering size, and the intermediate cell is transparent. In some cases, the cells are either iFrames, or separate applications.

A user may "exist" within the top layer world. The user is able to interact with the portal, including traveling through the portal to the bottom layer world. When this occurs, the order of the cells is reversed, with the second world (which the user is now in) becoming the top cell layer. The transform used is based upon a viewing direction of the user to the portal.

Note that the various features of the present invention described above may be practiced alone or in combination. These and other features of the present invention will be described in more detail below in the detailed description of the invention and in conjunction with the following figures.

BRIEF DESCRIPTION OF THE DRAWINGS

In order that the present invention may be more clearly ascertained, some embodiments will now be described, by way of example, with reference to the accompanying drawings, in which:

FIGS. 10A-10C are example illustrations of the sizing and transform of the underlying cell for illustrative purposes, in accordance with some embodiments;

DETAILED DESCRIPTION

Figure 1:
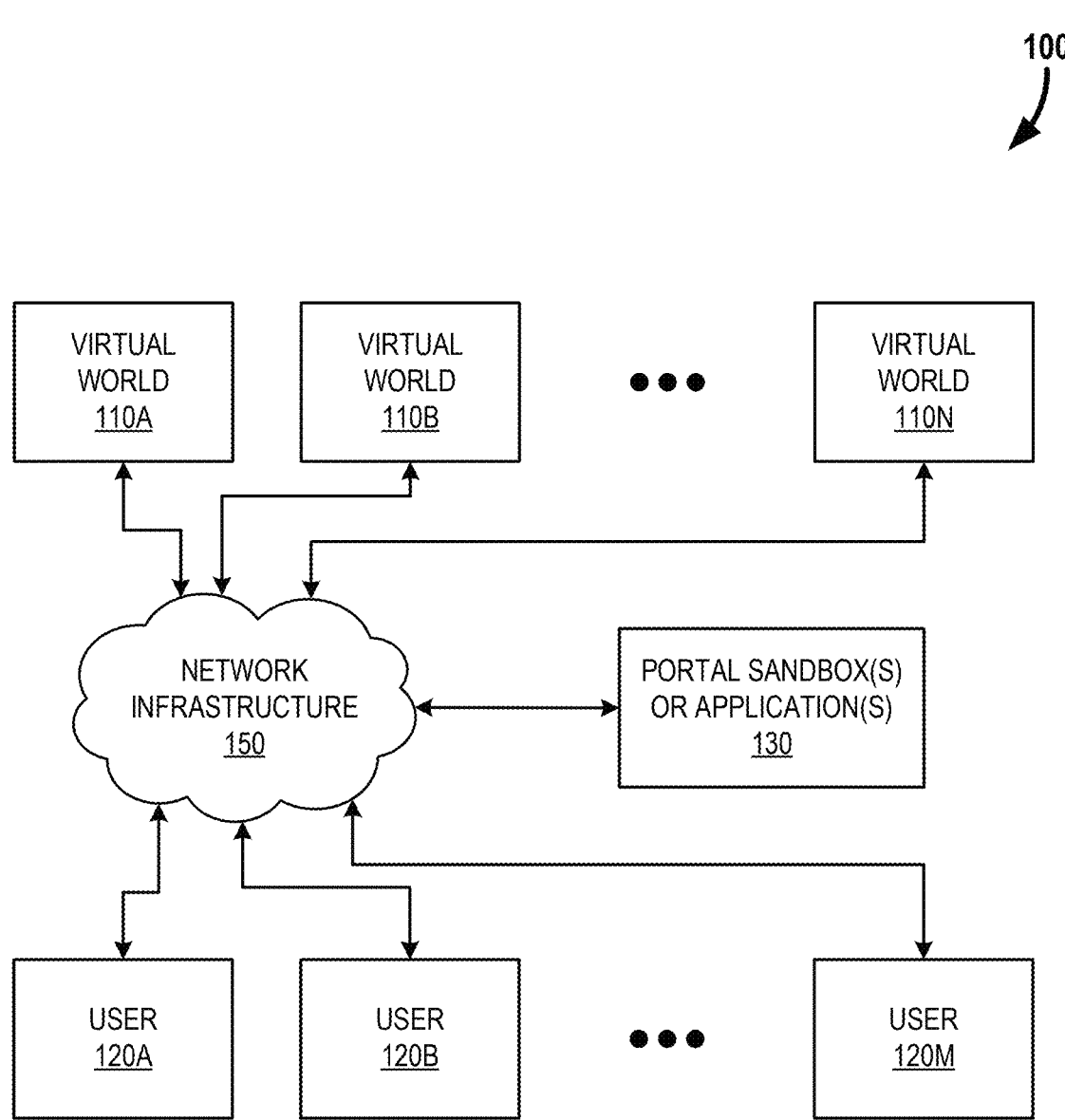
FIG. 1 is an example logical diagram of a system for multiple virtual environments between which portals are utilized to transport users, in accordance with some embodiments.

The present invention will now be described in detail with reference to several embodiments thereof as illustrated in the accompanying drawings. In the following description, numerous specific details are set forth in order to provide a thorough understanding of embodiments of the present invention. It will be apparent, however, to one skilled in the art, that embodiments may be practiced without some or all of these specific details. In other instances, well known process steps and/or structures have not been described in detail in order to not unnecessarily obscure the present invention. The features and advantages of embodiments may be better understood with reference to the drawings and discussions that follow.

Aspects, features and advantages of exemplary embodiments of the present invention will become better understood with regard to the following description in connection with the accompanying drawing(s). It should be apparent to those skilled in the art that the described embodiments of the present invention provided herein are illustrative only and not limiting, having been presented by way of example only. All features disclosed in this description may be replaced by alternative features serving the same or similar purpose, unless expressly stated otherwise. Therefore, numerous other embodiments of the modifications thereof are contemplated as falling within the scope of the present invention as defined herein and equivalents thereto. Hence, use of absolute and/or sequential terms, such as, for example, "will," "will not," "shall," "shall not," "must," "must not," "first," "initially," "next," "subsequently," "before," "after," "lastly," and "finally," are not meant to limit the scope of the present invention as the embodiments disclosed herein are merely exemplary.

The following systems and methods are for portals between virtual environments. These portals may connect different sandbox worlds, or even worlds in different applications together. This allows a user to "teleport" seamlessly between different virtual environments while avoiding the major undertaking required to connect worlds with differing rendering mechanisms and differing system code. Likewise, the present systems and methods reduce the security risks, considerably, of placing a portal between virtual worlds.

It should be noted that throughout this disclosure certain nomenclature is employed agnostically. This is in no manner intended to limit the scope of the presently described inventions. For example, an individual operating in a virtual environment may be referred to as a "user", "player", or "individual". These terms are intended to be synonymous. Likewise, a "virtual environment", "virtual world", or simply "world" are also intended to be synonymous. An "application" is the equivalent of a "program" or a "computer program". A "computer" may also be referred to as a "device" or a "machine". And so forth.

The architecture for this portal architecture is also platform agnostic, being able to be shared across any device. This ultra-portability enables sharing with virtually any other person, regardless of device they are using, or platforms deployed on the device.

To facilitate discussions, FIG. 1 provides an illustration of a system where this portal technology may be deployed, seen generally at 100. In this example environment, there is a plurality of virtual worlds 110*a-n*. These virtual worlds may each constitute a server (or banks of servers) hosting the world or may comprise distributed virtual environments. In some cases, the virtual worlds 110*a-n* are different sandboxes of a single application, and in other embodiments, some or all of the virtual worlds 110*a-n* are different applications.

A plurality of users 120*a-m* may 'exist' as avatars (or merely be visualizing) within these virtual environments 110*a-n*. The users are able to access the various virtual worlds via a network connection 150. In some embodiments, the network 150 may include a local area network (LAN), a wide area network, a wireless network, a cellular network, the internet, or any combination of the above.

In addition to providing access to the virtual worlds 110*a-n* for the users 120*a-m*, the network may be relied upon to couple together the various virtual environments 110*a-n* by portals. These portals are hosted by one or more portal sandboxes 130.

Figure 2:
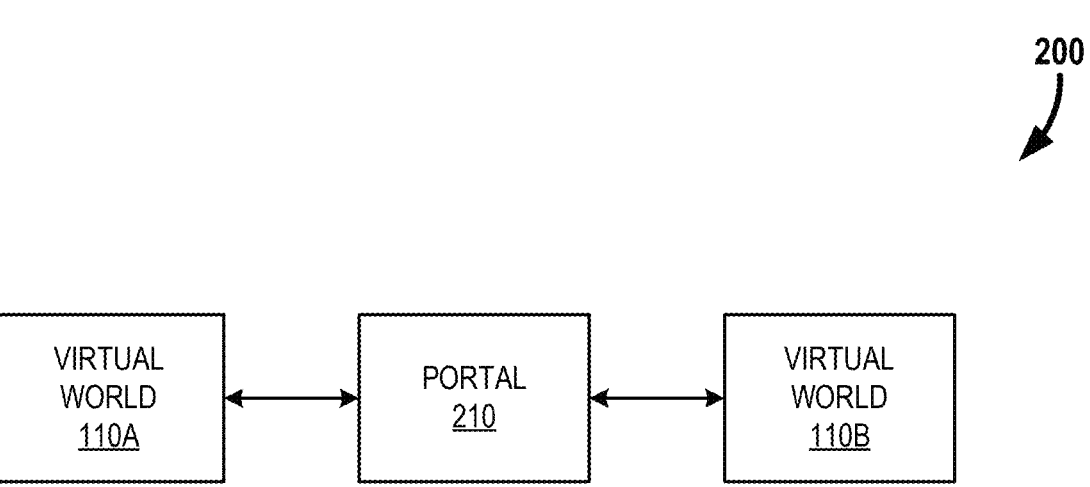
FIG. 2 is an example logical diagram of two virtual worlds coupled by a portal, in accordance with some embodiments.

In FIG. 2, a block diagram 200 is provided for the connection of a first virtual environment 110*a* via a portal 210 to a second virtual environment 110*b*. This allows a user 120 within one virtual environment to 'transport' or 'teleport' and see into other virtual worlds. This is accomplished by "portals" between the two different virtual environments.

The concept of portals between worlds is not a new one. However, as previously expressed, a significant complication to the deployment of traditional portals is that the portal is deployed in each virtual world in the same code space as the world itself. This opens a huge security risk to the virtual world, as the portal may include malicious code. Further, liking two different "kinds" of spaces is very difficult. It generally requires each world to load the other world's portal's link code. When the two worlds have a shared environment, this may not be as large an issue. However, most worlds do not have the same model of rendering and interactions, thus making portals between these worlds a non-trivial task. It requires the simultaneous viewing and engagement with various applications with very different rendering technologies and underlying system code. This may simply be impossible in some cases, and a significant expenditure of resources to complete, when it's even possible.

The presently disclosed portaling technology avoids these issues by using what is known as "cell-based" portals. Cell based portals provides a novel means to display and interact with portals while minimizing security risks. This technology also enables the mixing of different virtual worlds and even different 3D applications.

To improve security, the portals themselves are running in a separate sandboxed environment, or as a separate application altogether. This is a significant divergence from traditional portal technology, where the portals are embedded in the underlying virtual environments. Any malicious code, if introduced, is thus kept separate from the two virtual environments that the portal "connects". It should further be noted that these portals may also allow a user to see through them at a traditional web page. These web pages may be transformed in much the same fashion as the view of the virtual worlds, or distorted using CSS3 (Cascading Style Sheets). Thus, while the bulk of this disclosure will focus on the connection of two virtual worlds, it should be understood that this should be read synonymously with the connection of a virtual world to a web page.

The underlying worlds are implemented as native applications, in some embodiments. In alternate embodiments, the underlying connected virtual environments are implemented as web-based iFrames. Dependent upon operating system allowances, it may be possible to combine the use of iFrames with native applications. For this disclosure, for the sake of clarity, however, the focus will be on iFrame substantiations of the cell-based portal approach. This is no way intended to limit the scope of the disclosure, but is merely for clarification purposes.

"Cells" as defined herein, are different transparent layers that can be overlayed, one on top another, to generate a stack. Within each cell is, generally, a transparent portion, as well as rendered elements. When layered together, a complete image is produced. In the instant portaling discussion, each cell may be a rendering of an iFrame, and/or a native application.

Essentially, the cell-based approach to portals utilizes a layered image model, where each world is rendered in a separate cell (for example in a web based iFrame) with certain areas left transparent so that the user can see the cell "behind" or "underneath". The top cell is the world the user is currently in, which is rendered in all areas except where the portal is—this region is left clear—with layers underneath that are other worlds that the portal connects to. The portal itself is a separate, intermediate cell layer. The portal is rendered such that it is transparent.

In the case of iFrames, the top iFrame cell (the world the user is currently in) sends a message to the intermediate portal iFrame cell, which is underneath it. The message specifies a minimum rectangle shape (or other configured shape) needed to be rendered for the instant portal, as well as a transform needed for the underlying rendition. The 'lower' iFrame cell (the "other" world the portal is connecting to) then renders the scene in the rectangle (or other desired shape), responsive to the transform. As the portal itself is the only portion of the intermediate layer that is transparent, the user sees a perfect portal image of the rendered world. Generally, the transform applied includes a 4×4 matrix transform.

By limiting the rendering to the minimal rectangle/size, and requiring a transform of the image, the need to render the entire world view is eliminated. Additionally, a world may have many different portals, each going to the same or another world. By limiting the size and shape of the rendered world "underneath" the top layer world (the world the user is currently located in) there are two main advantages. The first, and most significant, is that it limits the possibility of interrupting views when there are many portals, or portals seen within portals. When there are these circumstances, there are many different cells that are layered one on top another. If the rendering of the content in a layer is not "tight" to the portal size, it has the potential to be visible through a different portal, and thus "block out" the image that should be viewable in the subsequent layer(s). Secondly, by rendering only a portion of the underlying world, it provides a significant reduction in computational demands. It should be noted that rendering a rectangle (or other designated shape, such as an ellipsis or a polygon "fitted" to the portal shape) of the minimal size designated by the topmost cell is the most efficient, it is not required. A larger sized rendering may instead be generated, although this is unnecessary and requires additional computational resources, and as noted, has the potential to overlap other portals, causing the wrong content to be seen in the other portal.

Closely fitting the rendered cell regions is particularly important when using Augmented Reality (AR) as opposed to a Virtual Reality (VR) environment. In AR, the areas around objects are transparent, thereby allowing the user to see the actual world around the objects. A portal in AR requires the underlying cell to very closely fit the portal shape, or risk occluding the AR vision. This is because in VR, the top layer renders around the portal. If the underlying layer "peeks out" around the portal space, it is covered up by the top layer rendering. In AR, there is no such luxury—as the top layer is already transparent around the portal region (in order for the real world to be visible).

Despite the numerous reasons that it may be preferable to have the shape and size communicated to the underlying layer(s) to be very precisely fitted to the portal size and shape, in some embodiments using a generic shape (such as a rectangle) is easily implemented and more easily rendered. Further, if the rectangle is fitted reasonably well to the portal shape, the risk of overlapping another portal is relatively minimal, as the other portal would need to be extremely close to the first portal. Again, however, ideally the portal shape and size are communicated in a more precise fashion, allowing for very tightly fitted renderings of lower cell layers.

The advantages of this cell-based approach are significant. As the layers do not need to communicate with one another (besides the minimum size and transform needed) there is a significant improvement in security (as the portal does not need to interface with either world's system code. Indeed, there is no way for one application to view or access data from the other application (including the rendered image) without complicated screen capturing capabilities. This minimization of shared information further increases the security of such a system. Further, as the code from one environment does not need to interact with the system code/rendering technology of the other virtual environment, two entirely different worlds/applications may be coupled without significant efforts put into making their rendering compatible.

Figure 3:
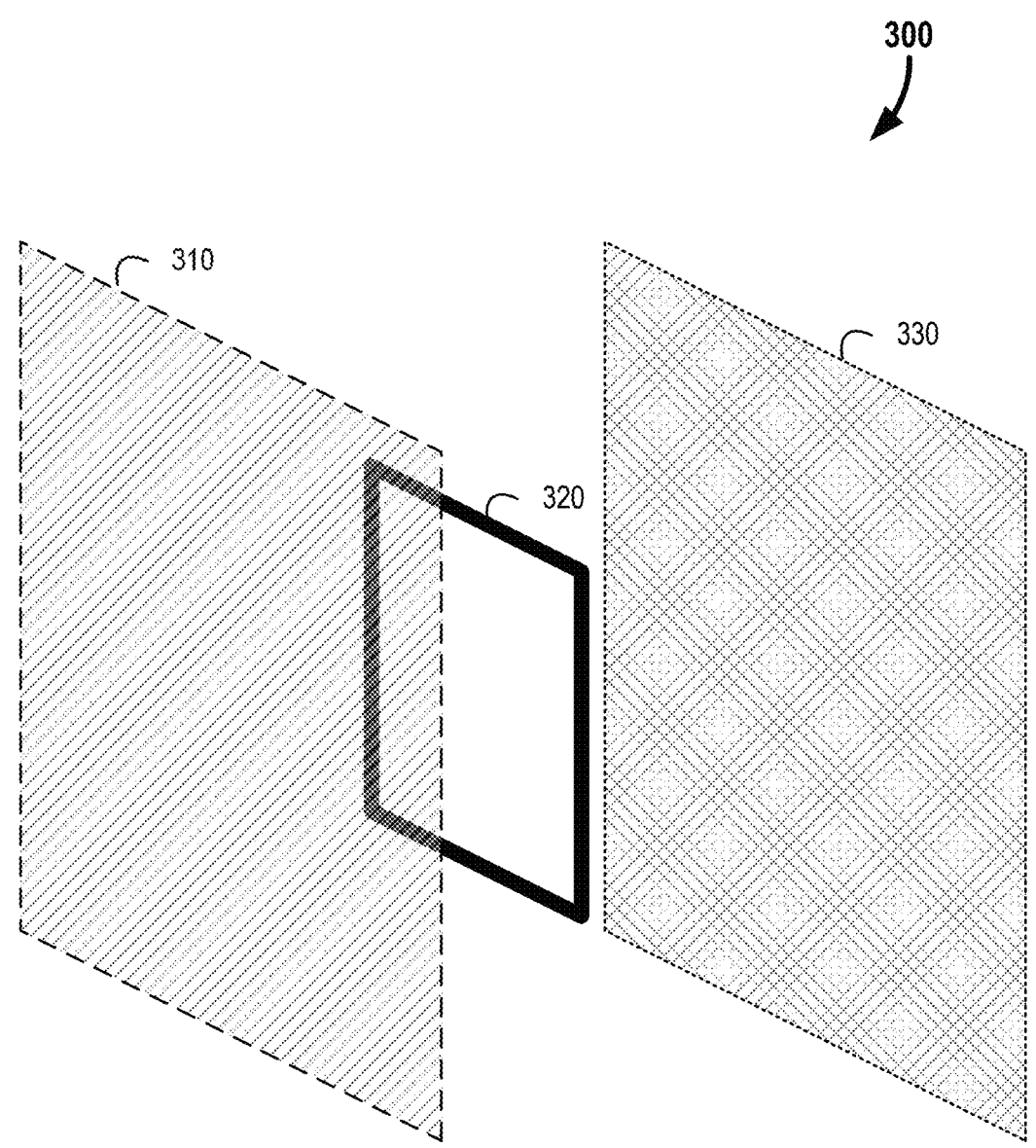
FIG. 3 is an example illustration of separated cells that enable portaling between different virtual spaces from an oblique viewing angle, in accordance with some embodiments.

In order to more clearly illustrate the concepts behind this cell-based approach, a series of illustrations are provided to more clearly explain the theory and application of cells to generate portals between spaces. For example, in FIG. 3 one example illustration 300 is provided of the various cells in play in the instant embodiment. These first few illustrations (FIGS. 3-5) are oblique views of the cell layers, as to put perspective to how the cells are layered one atop another. This is not the view a user of the system would experience, which would be head-on view of the cell layer rendering.

However, for the sake of clarity in the method of cell layering, these first few Figures are provided. Later Figures provide more representative views of the rendered cells and should be recognized as the view experienced by a user.

The "top" cell 310 is a rendering of the world the user is currently within. Although illustrated as a monolithic layer, this cell includes a transparent section where the portal exists and may include any number of rendered objects (including 3D environments (as will be seen in later Figures).

"Underneath" the top cell, is the portal cell layer 320. As noted, the portal layer is a separate sandbox or even a separate application as compared against the other cells. The portal cell includes a transparent portion within the portal region (and generally is entirely transparent). As the top layer is not transparent around the portal, the remainder of the portal cell may be either transparent or not. Either way, the top cell layer is rendering the scene around the portal itself.

Underneath the portal cell layer is the layer 330 for the "other" world being viewed and potentially interacted with. Again, a monolithic image is displayed, however this layer may likewise include shapes, objects and other users. However, rather than rendering the entire bottom layer (with an attendant computational cost and risk of occluding other portals in the top layer), it is more efficient for the top cell layer (the world the user is currently in), to provide a minimum shape (a rectangle in this instance, however other shapes are contemplated based upon portal shape), and size, as well as a needed transform for the image.

Figure 4:
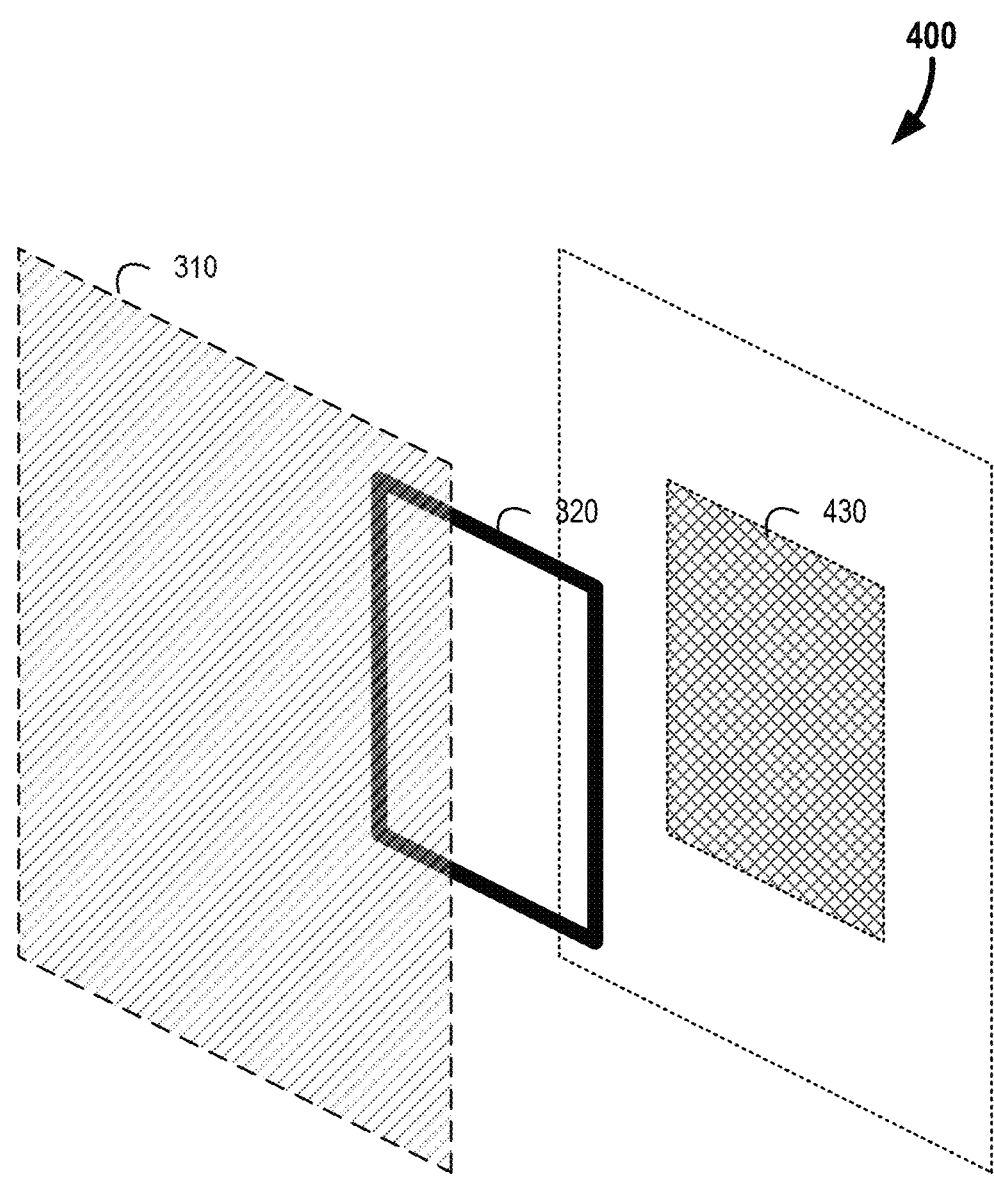
FIG. 4 is an example illustration of the rendering of a confined portion of the underlying world in a separated cell from an oblique viewing angle, in accordance with some embodiments.

FIG. 4 provides an example illustration 400 of the result of the top cell layer 310 communicating this sizing and transform information to the portal cell layer 320.

In turn, the bottom layer renders a cell that includes the correct sized rectangle and applies the appropriate transform, thereby resulting in a small rendition within a transparent cell 430. Again, the rendered size need not be as small as the minimum size communicated by the top cell layer 310, but computationally it is prudent to match or at least only marginally exceed the designated minimum size. Likewise, rendering the bottom layer to fit tightly to the portal dimensions ensures that potential other portals in the top layer are not covered accidentally by a rendering of an improper layer. Multiple portals and renderings will be covered in greater detail in relation to FIGS. 12 and 13 below. Rendering a rectangle (or other designated shape) below the minimum size will result in a "gap" around the rendered image when viewed through the portal. This is disruptive and undesirable from a user's perspective.

Figure 5:
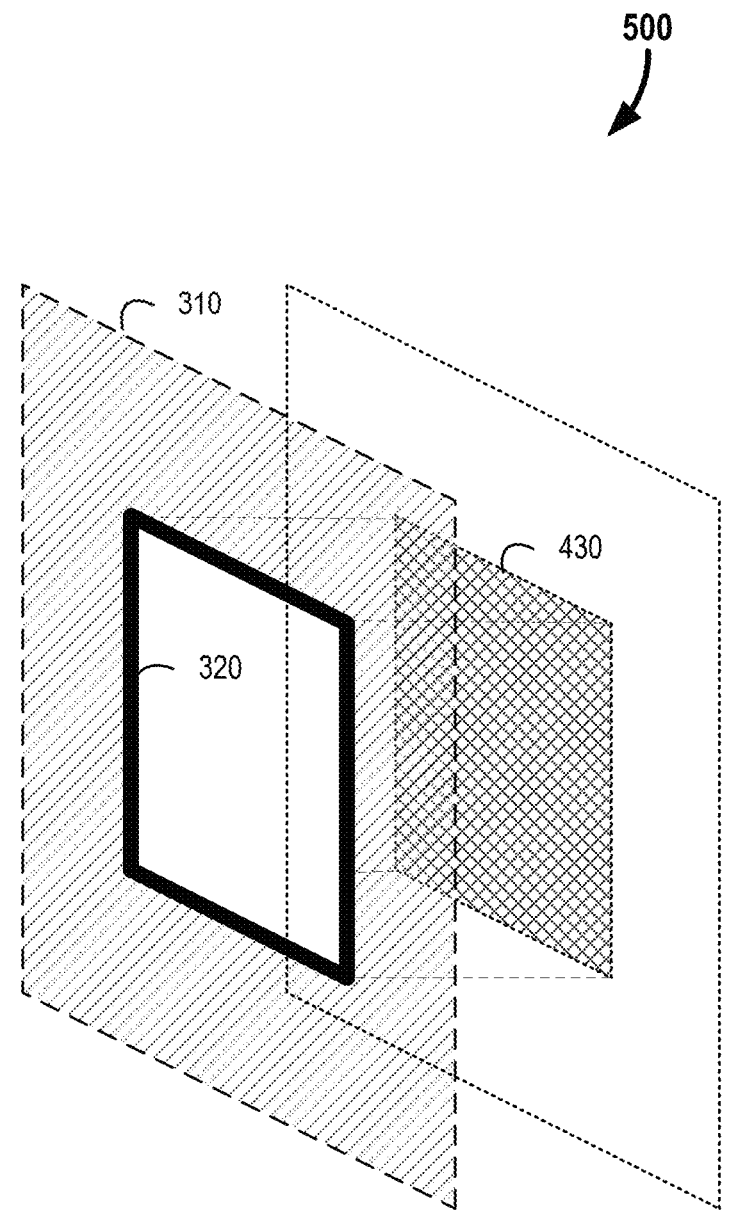
FIG. 5 is an example illustration of the top cell and portal cell collapsed from an oblique viewing angle, in accordance with some embodiments.

FIG. 5 provides an example illustration 500 of the layers partially collapsed. Here the top cell layer 310 has been merged with the portal cell layer 320, resulting in a transparent portion where the portal is located. The bottom cell 430 is still illustrated as being apart and separate from the amalgamated top and portal cells. This is for illustrative and clarity purposes only, because once merged as a stack of cell layers differentiating between them becomes difficult conceptually. The resulting rendition, as seen by a user of the system, can be seen in the example illustration 600 of FIG. 6.

In this example illustration 600, the view is from directly in front of the portal (as opposed to the prior three Figures which were oblique views to assist in differentiating the various layer cells). Here, however, the cells have been merged, and what is seen is the top cell 310 providing much of the rendering. In this illustration, the top cell has been displayed with a horizon line and a pair of shapes for illustrative purposes. Only the region of the portal 320 is transparent in this instant substantiation. A user would be located in the world that is rendered in this top cell layer.

Below this layer exists the portal layer 320. Again, the portal layer is transparent in the portal region (and generally the entire cell) such that the user may see the cell layer 430 below it. The purpose of the portal layer 320 is to provide separation between the two worlds, and transfer the sizing and transform information from the top cell to the bottom cell.

The bottom layer 430 receives the sizing and transform message and generates a rectangle (in this instance) at least as large as the minimum size (and generally not exceeding the size, if possible), and applies the required transform to ensure the rendered image looks "right" to the user.

Figure 7:
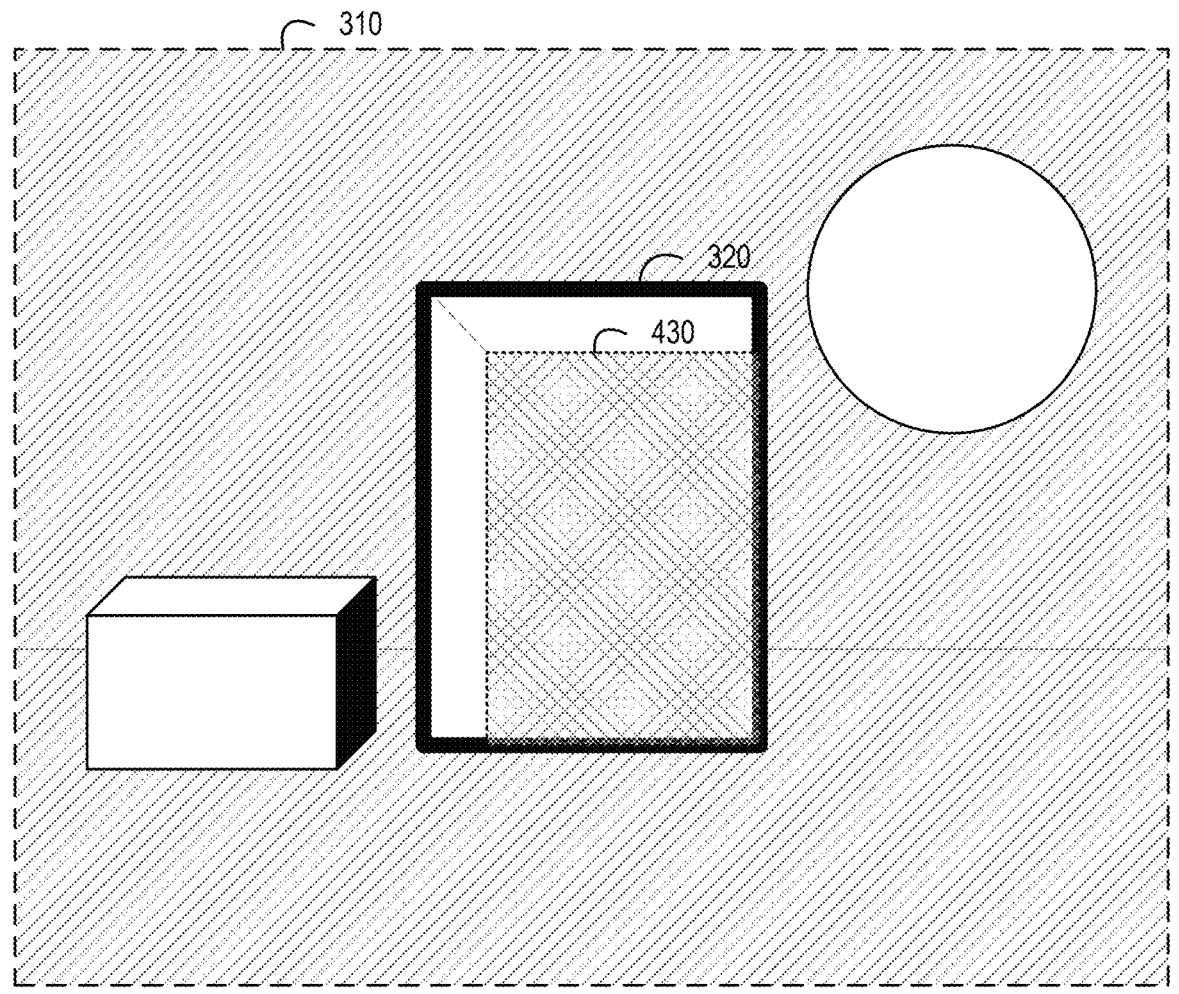
FIG. 7 is an example illustration of a forward view of the rendering of a portal with the underlying cell offset for illustrative purposes, in accordance with some embodiments.

To better illustrate the placement of the cells, FIG. 7 provides an illustration 700 of the same view of the portal from directly in front of it, however in this example drawing the bottom cell 430 is offset in order to show that it is rendered only for the size of the portal 320 itself. Under any normal operation, this view with the lower cell 430 offset would never occur, as it ruins the visual experience for the user. However, for the sake of understanding the placement and transparency of the portal layer 320, the instant illustration 700 is provided.

Figure 8:
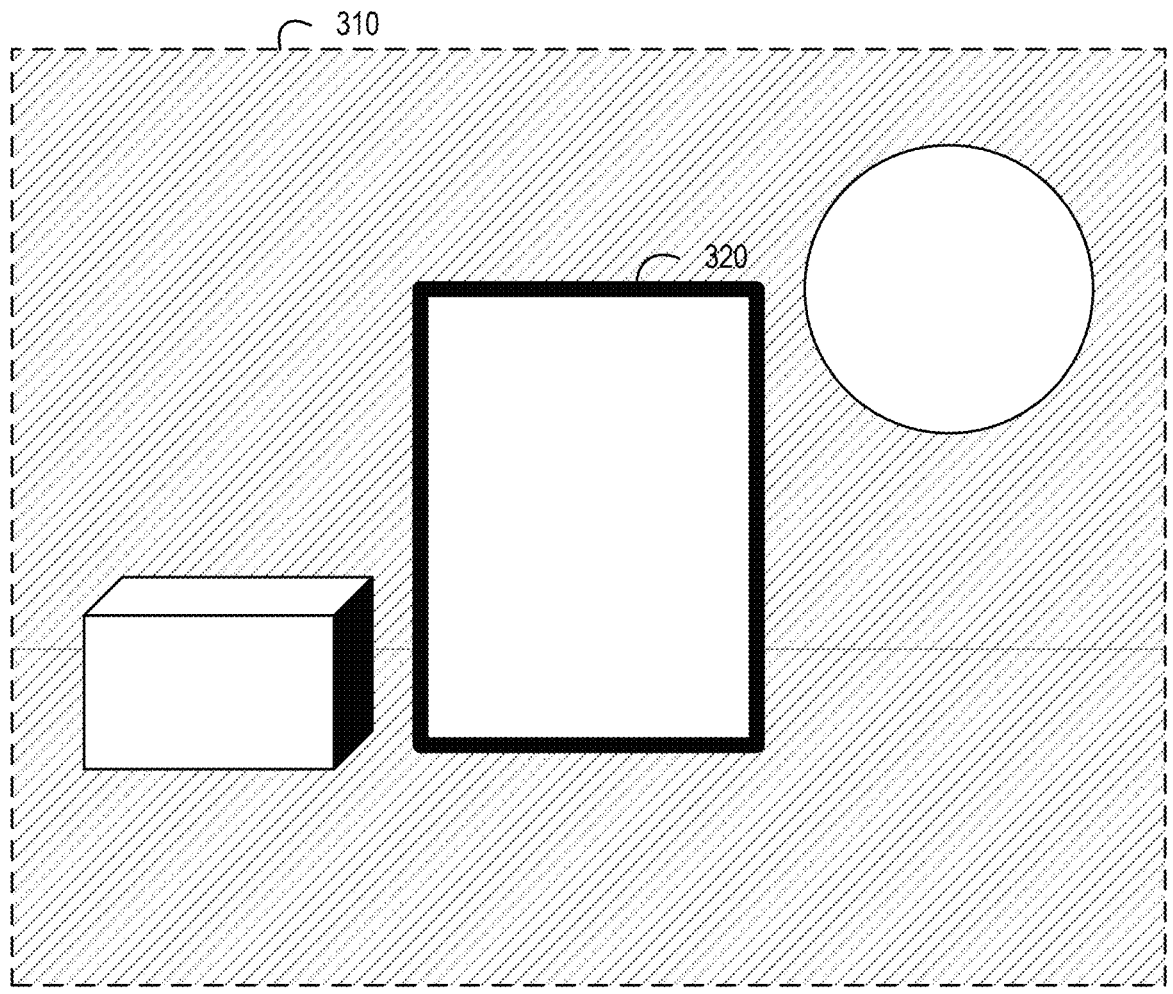
FIG. 8 is an example illustration of a forward view of the rendering of a portal without the underlying cell for illustrative purposes, in accordance with some embodiments.

Similarly, FIG. 8 provides an illustration 800 of the top cell 310 and the portal cell 320, without the bottom cell present. The top cell 310 renders the entire view of the user, except for where the portal 320 is located. This portion of the cell is transparent. Similarly, the portal cell 320 is likewise transparent in at least this region. As no bottom cell is present in this example illustration 800, there is nothing rendered in the portal region for this Figure.

Figure 6:
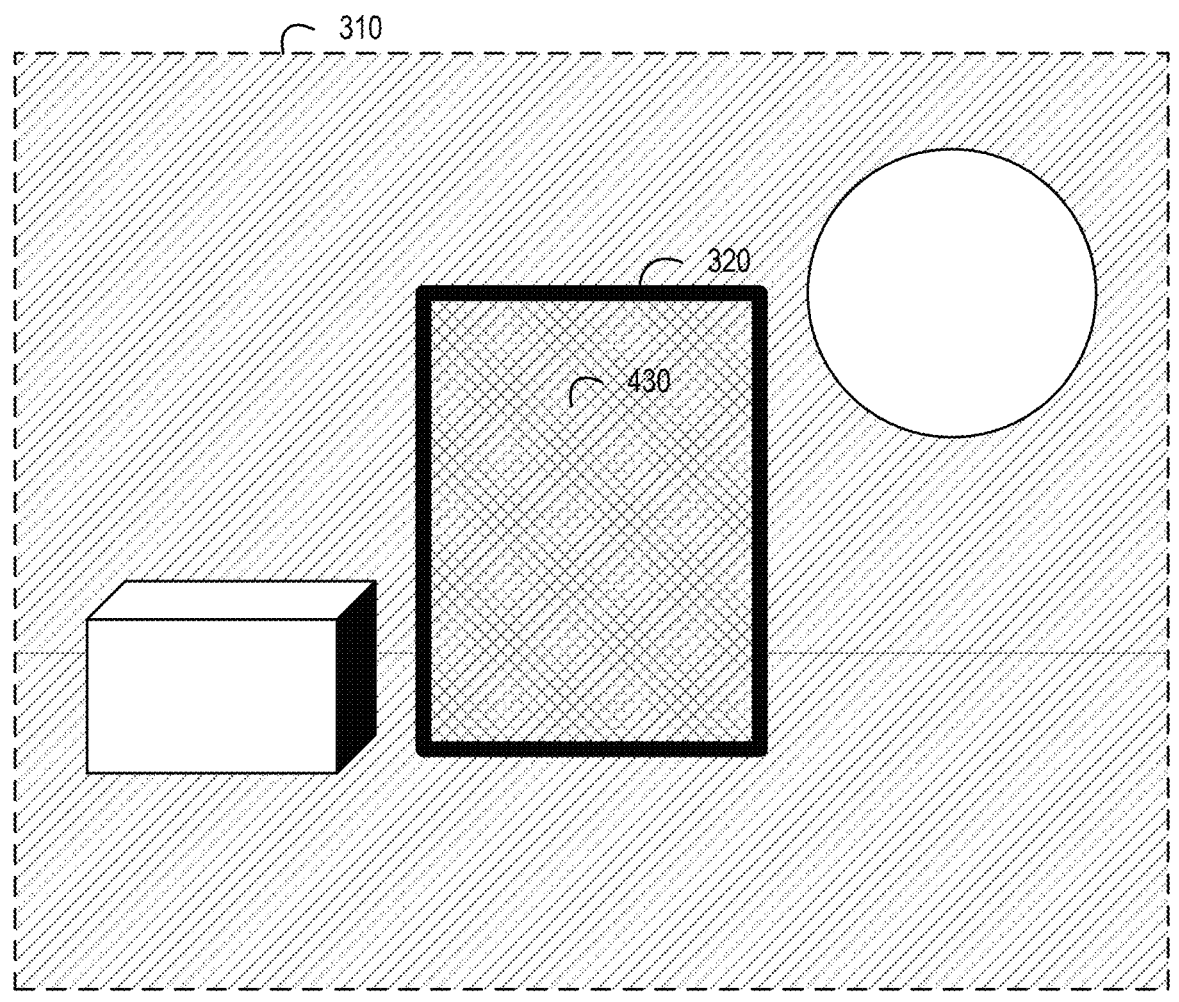
FIG. 6 is an example illustration of the rendering seen by a user when looking at a portal directly, in accordance with some embodiments.
Figure 9:
FIG. 9 is an example illustration of a forward view of the rendering of a portal without the top cell for illustrative purposes, in accordance with some embodiments.
Figure 9:
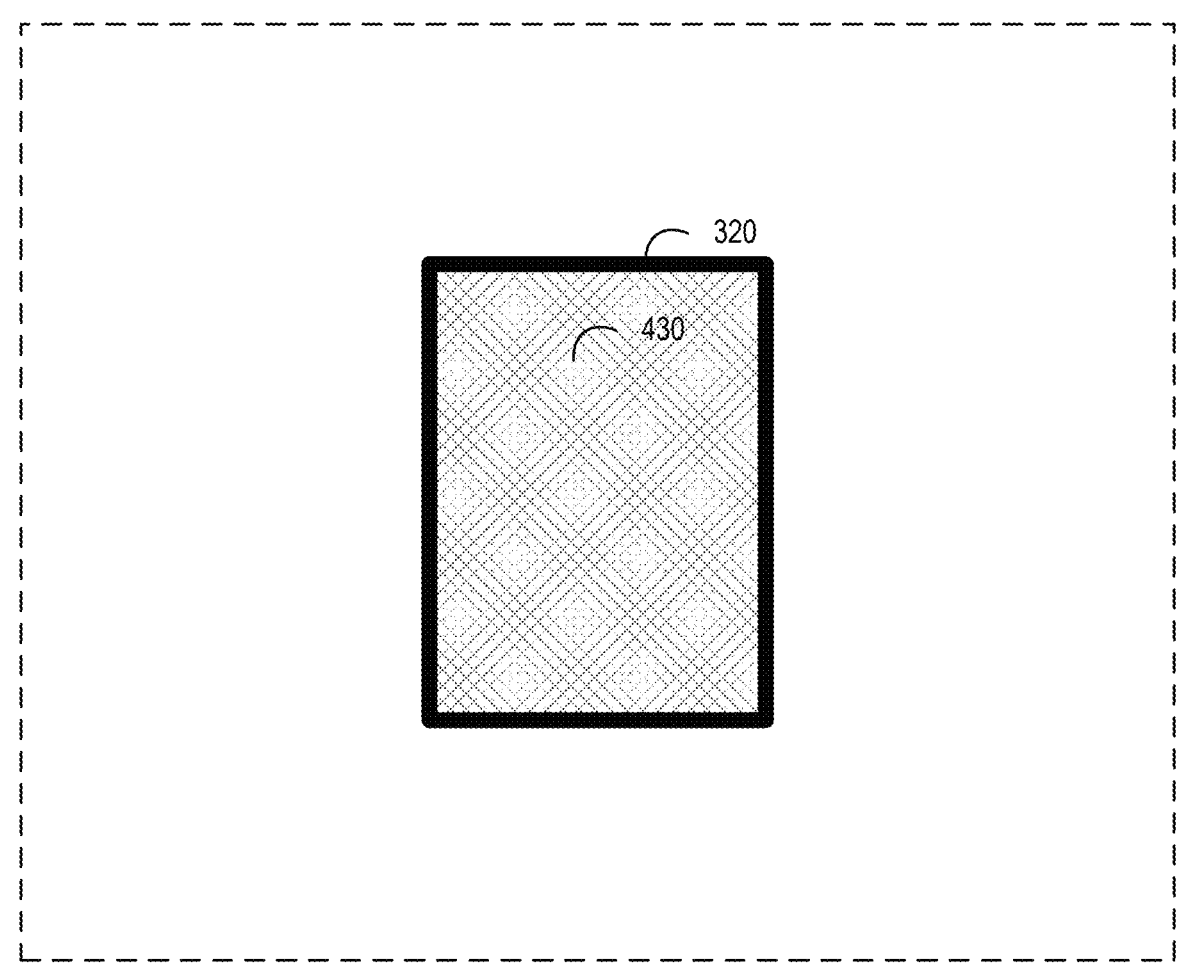

Conversely, FIG. 9 provides an illustration 900 of the bottom cell 430 and the portal cell 320 rendered. The regions around the portal are not rendered by either of these cell layers (it is transparent). As the top cell layer is missing, there is nothing rendered except in the portal region. As such, all layers should be present in order to generate a full rendering of the view from the user's perspective (as seen in FIG. 6).

FIG. 10A provides an illustration 1000A of the bottom layer 430 when viewed from directly forward. For illustrative purposes, the rendering includes a set of objects. When the user moves to the side of the portal, the area viewed gets shifted as the viewing angle of the portal is changed. This results in a different sized rectangle being needed to fill the portal space, as well as distorting and changing what is seen "through" the portal. This results in the top layer (the world the user is located in) providing the bottom layers a new sizing requirement, as well as a transform needed for the underlying image.

A messenger API is leveraged in order to communicate the sizing and transform information from one cell to another. There are three kinds of messages: 1) sent from an application to a container, 2) sent from the container to an application, and 3) sent from a container to all the applications. An application cannot send a message directly to another application—this increases security for each of the virtual worlds. The messenger API is accessible through a global object.

In some embodiments, there are two typical communication protocols. The first protocol is that a party sends a request to another and handles the response when it arrives. For example, a newly launched application sends a request to the messaging platform to query user information, and the platform responds with the information. The other kind of protocol is where a party sends a message spontaneously. An example of this protocol is where an application sends a pointing device position to the platform as the user moves it (and thus generates a pointer-movement events) within an application. There is a convenience method at the API that sets up the pointer-movement publishing mechanism and handles a detach event so that the event handler is removed. Thus, an application can simply call a simple request to let the container know where the pointer is located. The platform uses icon definition, the name of the application, and in some cases the readable session name. When an application launches it creates a URL from the template it opens and sends a message to the platform informing it that it is ready to receive messages. The application may also send requests to the platform. The platform sends a request to query the applications information, and the platform may send responses to the requests. The application responds to the information request. And lastly, the platform sets up a frame with that information.

FIG. 10B provides an example illustration 1000B of the rendering produced when these sizing and transform messages are received. Here, the user has moved to the right of the portal by roughly 20 degrees, and is viewing it askew. The width of the portal appears narrower due to perspective. The resulting sizing minimum is thus the larger height (the closer side of the portal) and the reduced width. Again, this assumes that the portal size and shape are rectangular rather than "fitted" to the portal shape. Fitting to the portal shape may be superior from a rendering perspective (as it reduces the possibility that the rendering inadvertently shows through another portal), but it is a more complicated task than rendering a rectangular shaped underlayer image. The transforms that are received are utilized to alter the image qualities by skewing, reducing, or changing the angle of viewing of the scene in the bottom cell.

Similarly, FIG. 10C provides an illustration 1000C of the rendering if the viewer/user travels even further to the right of the portal (roughly at a 45 degree angle to the portal). This illustration is intended to show how the view and shape alter based upon portal viewing angle.

Figure 11A:
FIGS. 11A-11C are example illustrations a user's view of the rendering of a portal with the underlying cells sized and transformed for illustrative purposes, in accordance with some embodiments.
Figure 11A:
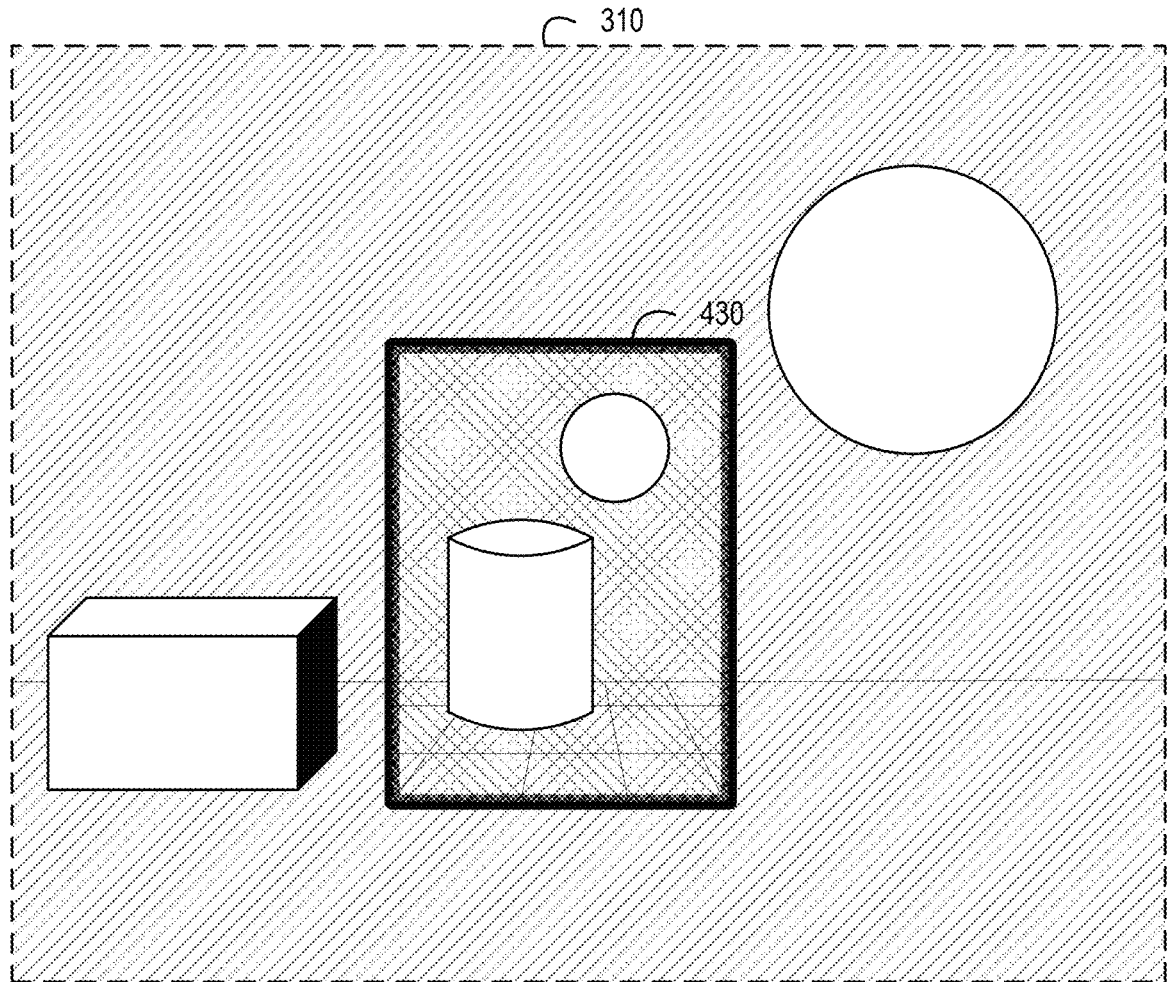
Figure 11B:
Figure 11B:
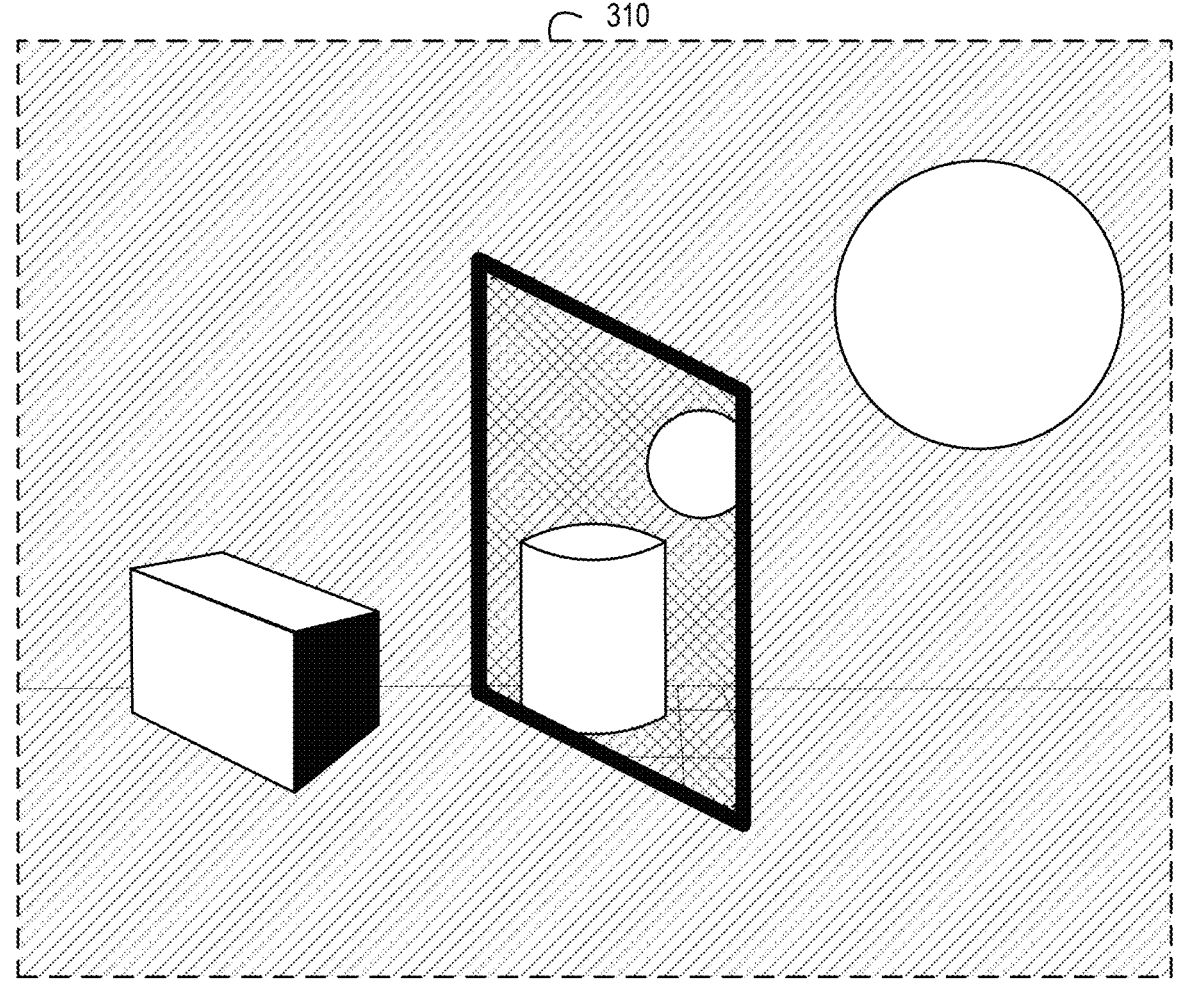
Figure 11C:
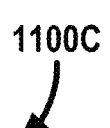
Figure 11C:
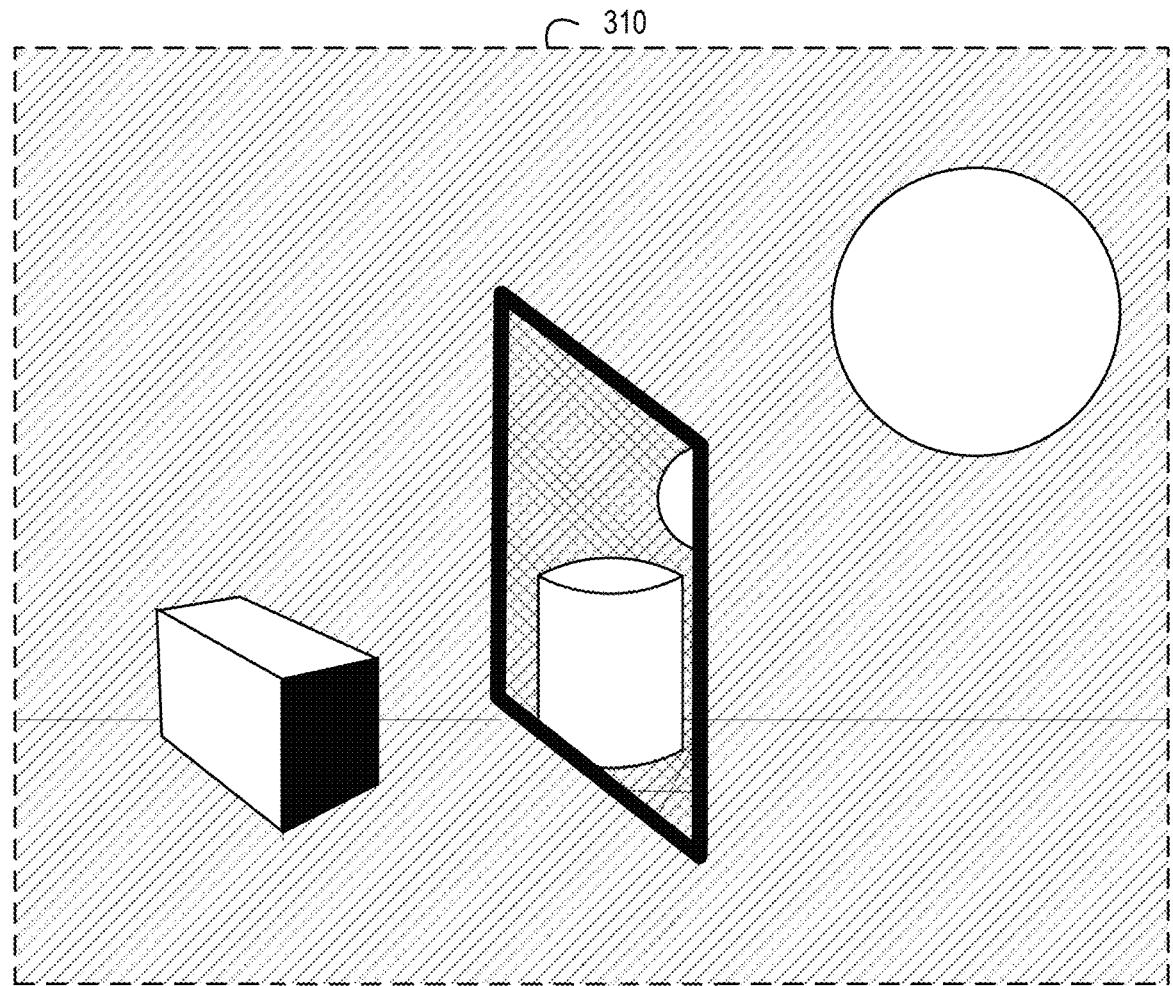

Turning now to FIG. 11A, an illustration 1100A is provided of the portal being viewed from directly in front of it. As can be seen the top layer is rendered from the user's perspective, and the lower layer rendering, as seen in FIG. 10A is layered directly under the transparent portal region. Contrast this with FIGS. 11B and 11C, where illustrations 1100B and 1100C, respectively, are shown as the user moves to the right of the portal. The newly rendered bottom cells behind the portal cell 320 and the top cell 310, when viewed from an angle, are fitted (mostly) to the transparent portal shape and size. As can be seen, the previously rendered rectangle of FIGS. 10B and 10C, respectively, are layered behind the other cells. The top and bottom of the cell rendering is partially concealed by the top cell 310 (since the shape used is a rectangle rather than a more precise shape that matches the transparent portion of the portal), resulting in a perfect viewing of the other world through the portal.

Figure 12:
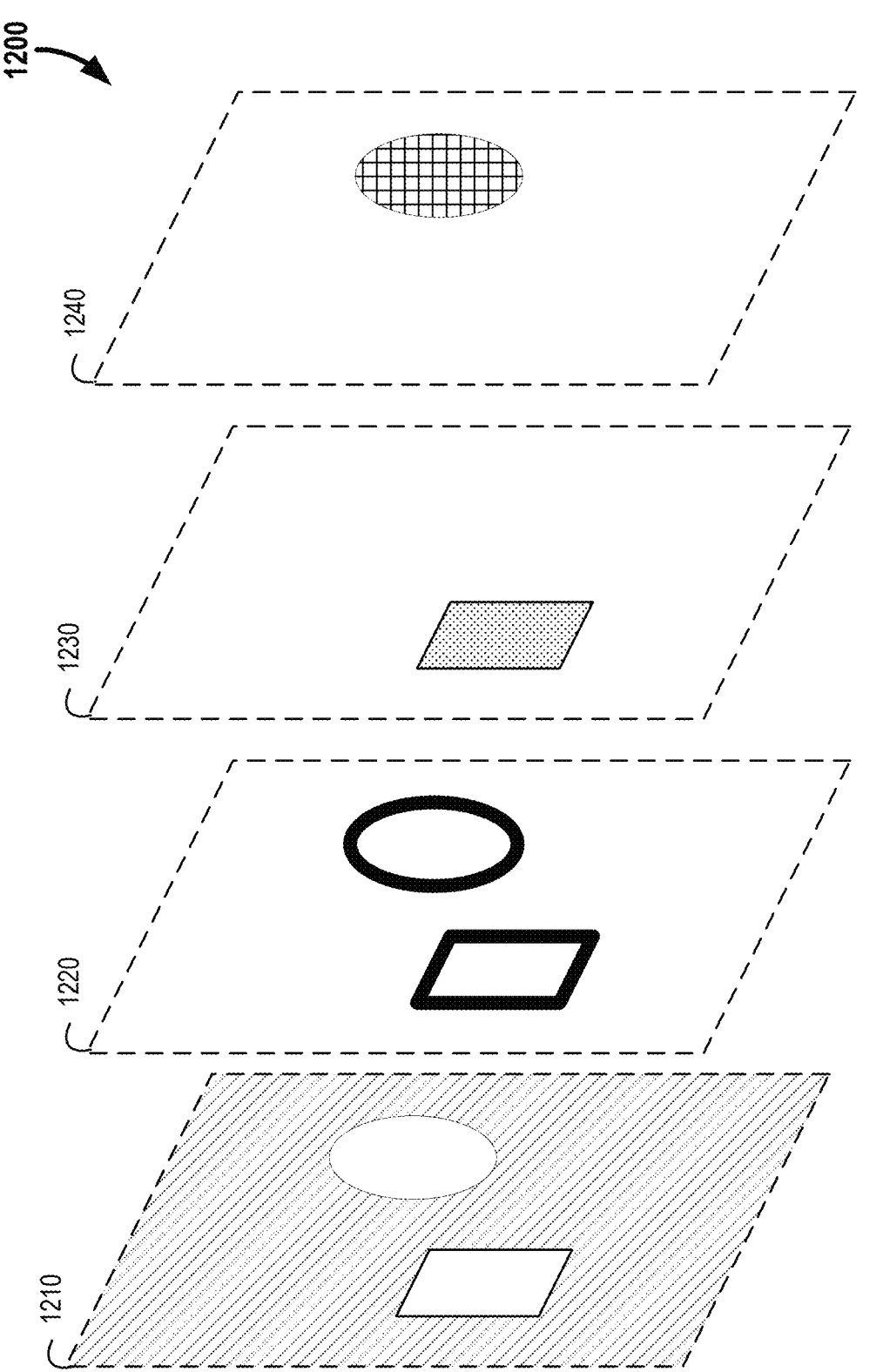
FIG. 12 is an example illustration of an oblique view of multiple cells for multiple portals, in accordance with some embodiments.

Turning now to FIG. 12, an oblique illustration 1200 of a set of cell layers when multiple portals are present is provided. Again, this oblique view is not what a user would ever see. Instead, it is intended to provide perspective and clarity around the different layers from a conceptual perspective. The following FIG. 13 provides the illustration of what a user of the system would actually see.

In this FIG. 12, the top layer 1210 (the world in which the user exists) is rendered everywhere except for where portals are present. In this illustration, two portals are seen, one rectangular and one elliptical. Beneath the top layer exists the portal cell layer 1220, which receives the sizing and shape information from the top layer and communicates it to the following lower layer worlds. Next is the first "other" world layer 1230 which is where the rectangular portal connects to. As can be seen, this layer is transparent except for the region where the rectangular portal is present. This exact region is rendered for this layer 1230.

Subsequently, there is yet another layer 1240 associated with a third world. This world is connected to the first world layer 1210 by the elliptical portal. In this bottom layer 1240 the region on the elliptical portal is rendered, and the remaining area around this rendered portion is transparent. In other embodiments (not illustrated) many additional portals (even portals within portals) may be present. These would result in yet other layers beneath those shown here. The important thing to note, however, is that since layer 1230 is transparent everywhere besides the region where its portal is present, the underlying layer 1240 is visible from the transparent portal of the top layer 1210.

Figure 13:
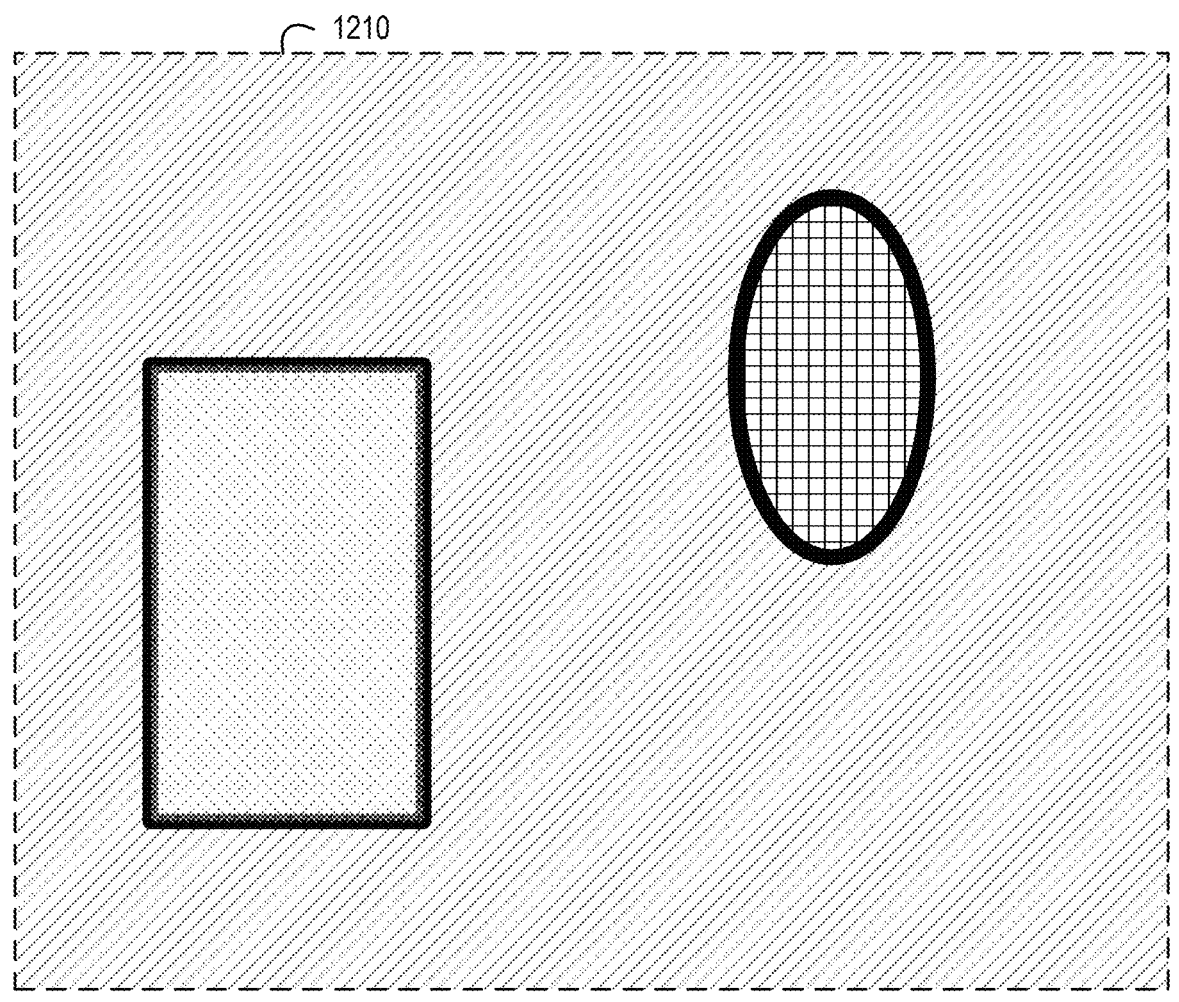
FIG. 13 is an example illustration of the user's view of multiple cells for multiple portals, in accordance with some embodiments.

When viewed from within the virtual world by a user, the result of this many layered system presents as a seamless view, as seen at 1300 of FIG. 13. The world the user is located in (the top layer 1210) renders the bulk of the viewing area. The regions of the portals are transparent, allowing the user to see the underlying layers. Through the rectangular portal the user sees the first underlying world layer 1230. Through the second, elliptical portal, the user sees through the layer 1230 (as it is transparent in this region), and sees the rendered portion of the next layer 1240. As noted, this can be performed many times, for as many layers as it needed, based upon portal numbers and locations.

Now that the general concepts of cell rendering and layering in order to enable portals that are secure between different worlds (which may include different applications) has been disclosed, attention will now be focused on the process flows involved in deploying and interacting with these portals.

Figure 14:
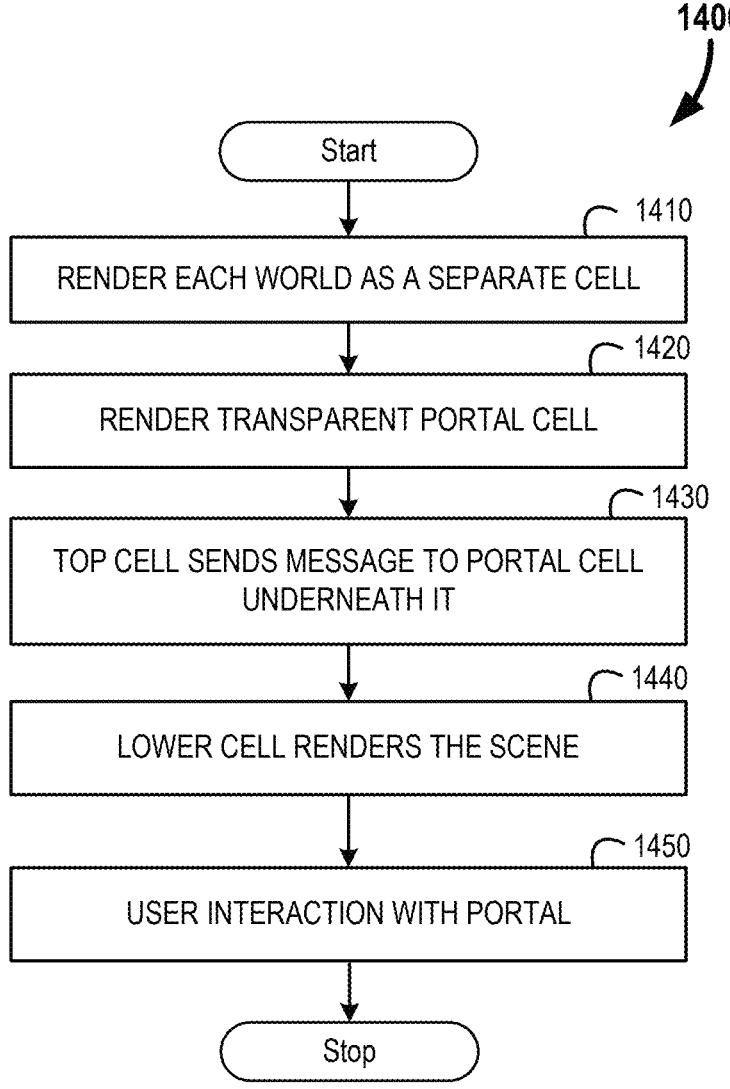
FIG. 14 is a flow diagram for an example process of deploying a secure portal between two virtual spaces, in accordance with some embodiments.

FIG. 14 provides a flow diagram 1400 of an example process flow for the deployment and interaction with portals between different virtual worlds. Initially each world is rendered as a separate cell (at 1410). The top cell is rendered to include a transparent portion where the portal exists. The portal cell, is likewise rendered (at 1420), as a transparent cell. This portal cell sits between the two world cells. The top cell (e.g., the world in which the user's avatar exists within) sends messages to the portal cell underneath it (at 1430).

Figure 15:
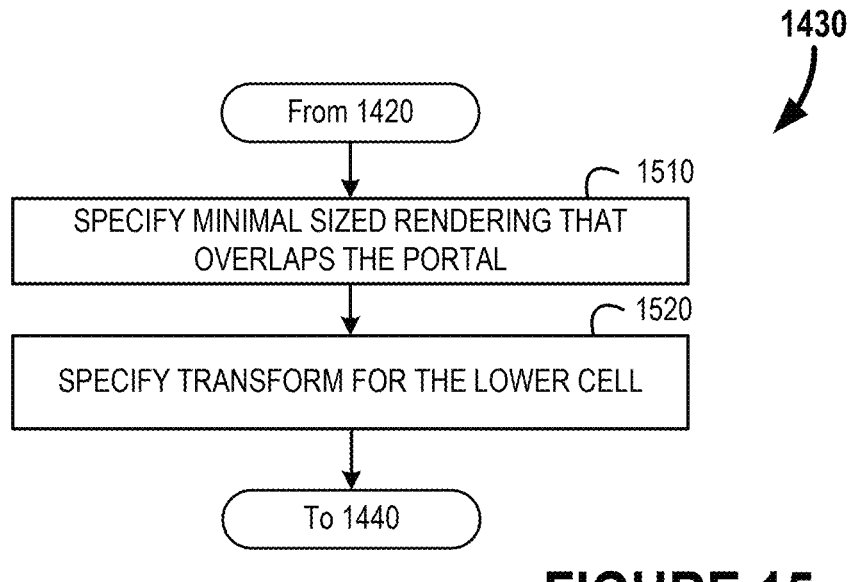
FIG. 15 is a flow diagram for the sizing and transform of the underlying cell, in accordance with some embodiments.

FIG. 15 provides greater detail regarding the message being provided from the top world to the cells underneath it. In this sub-process, the top cell specifies a minimal rendering size that overlaps with the portal (at 1510). This minimal size may be exactly the same size as the portal, or may be larger than the portal. Being larger than the portal has no ill effect, as the top cell, where it is not transparent, will hide any lower cell renderings unless another portal is close to the first portal (leading to a transparent portion too close to the first portal). Additionally, having too large a specified size may result in more of the underlying world being rendered as is strictly necessary. This costs computational resources, and thus, for both these reasons, it may be desirable to avoid specifying a minimum size too larger than the portal itself, and rather fitting the size tightly to the transparent portal region. In addition to specifying the minimum rendering size, the top cell may relay one or more specific transforms (at 1520) to the cells underneath it. These transforms may provide instructions regarding angle, skew, zoom and the like. These transforms may be based upon 'where' the user's avatar is located/the viewing angle of the user. These transforms alter the rendering of the underlying world to fit the direction and distance the underlying world is being viewed from.

Returning now to FIG. 14, the lower cell uses the information in the message to render (at 1440) a rectangle (or other shape based upon portal geometry) that meets the minimum size requirement set out in the message, and subject to the transform(s) provided in the message. The cells are all layered, such that the user views the scene as a fully rendered contiguous image. Lastly, the user is able to interact with the portal itself (at 1450) in order to travel between the worlds.

Figure 16:
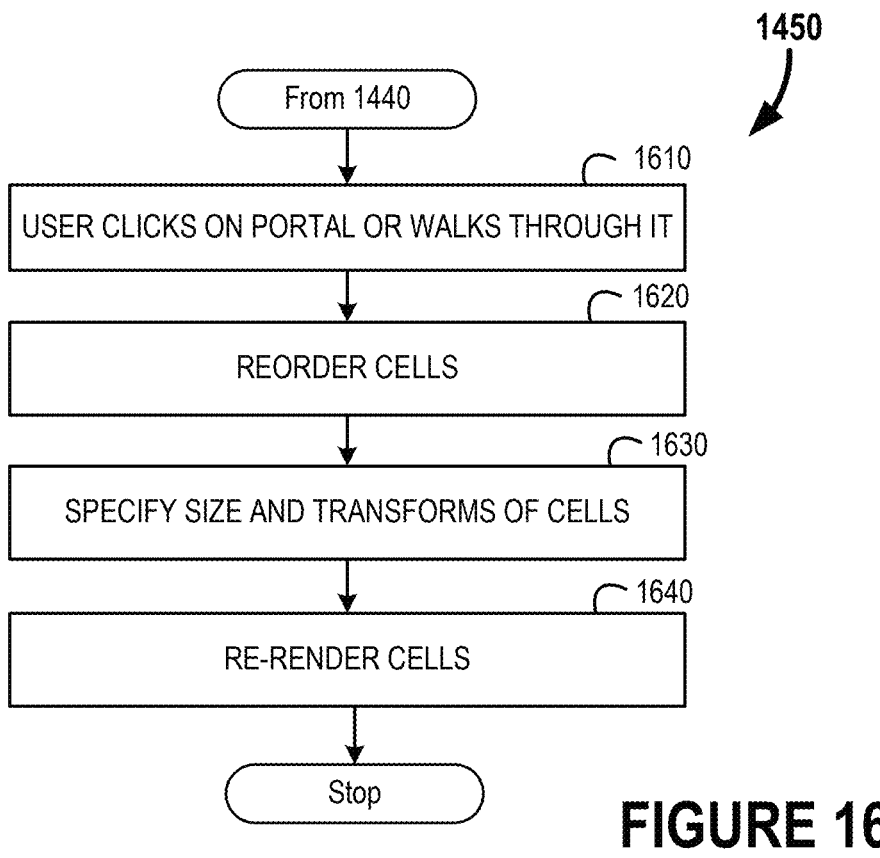
FIG. 16 is a flow diagram for an example process of a user interacting with the portal, in accordance with some embodiments.

FIG. 16 provides more detail into the process of user interaction with the portal. In order for the user to interact with the portal, the user should 'click' or select the portal with an input device (e.g., mouse, VR controller, hands, etc.), or otherwise "walk" through the portal (at 1610). "Walking" may involve actually physically stepping through a space where the portal is mirrored in the virtual environment, or otherwise controlling the user/user's avatar, to move through the portal space.

Once the user 'moves' through the portal, the cell order reverses (at 1620). This reversal means that the bottom cell, or cell to which the portal renders, which represented the 'other' virtual environment, changes to the top cell, and renders all the viewable area except for the region where the portal is located (which is made transparent). Conversely, the old top cell, is moved to the bottom, where it renders only the portion dictated by the new top cell. This rendering, again, is subject to the minimum size and transform requirements of the new top cell (at 1630). All cells are thus re-rendered to again provide the user with a seamless viewing experience (at 1640).

Figure 17A:
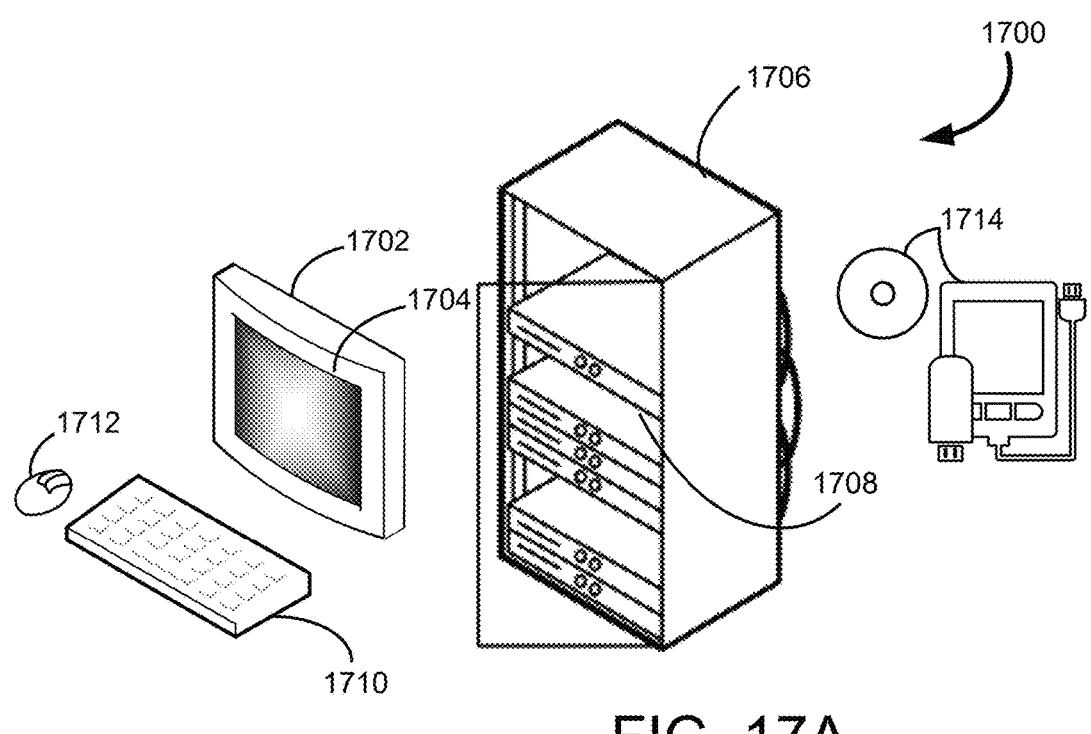
FIGS. 17A and 17B are example illustrations of a computer system capable of embodying the current invention.
Figure 17B:
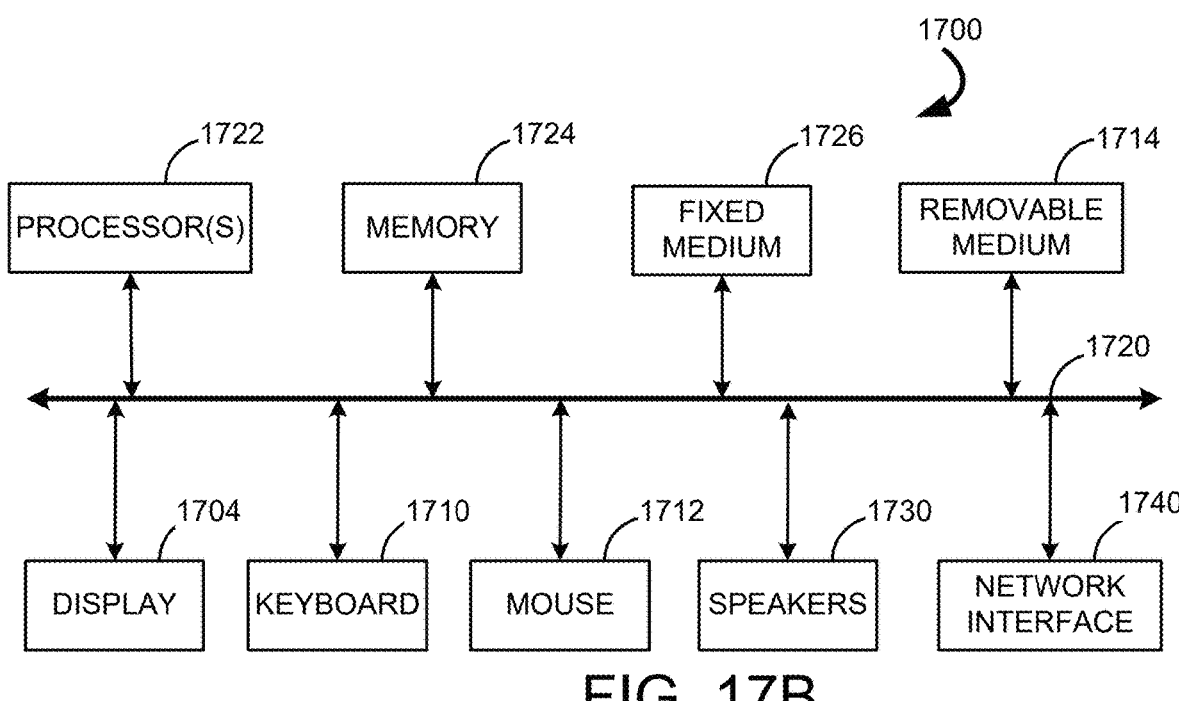

Now that the systems and methods for the deployment and interaction with secure portals between virtual worlds have been described, attention shall now be focused upon systems capable of executing the above functions. To facilitate this discussion, FIGS. 17A and 17B illustrate a Computer System 1700, which is suitable for implementing embodiments of the present invention. FIG. 17A shows one possible physical form of the Computer System 1700. Of course, the Computer System 1700 may have many physical forms ranging from a printed circuit board, an integrated circuit, and a small handheld device up to a huge supercomputer. Computer system 1700 may include a Monitor 1702, a Display 1704, a Housing 1706, server blades including one or more storage Drives 1708, a Keyboard 1710, and a Mouse 1712. Medium 1714 is a computer-readable medium used to transfer data to and from Computer System 1700.

FIG. 17B is an example of a block diagram for Computer System 1700. Attached to System Bus 1720 are a wide variety of subsystems. Processor(s) 1722 (also referred to as central processing units, or CPUs) are coupled to storage devices, including Memory 1724. Memory 1724 includes random access memory (RAM) and read-only memory (ROM). As is well known in the art, ROM acts to transfer data and instructions uni-directionally to the CPU and RAM is used typically to transfer data and instructions in a bi-directional manner. Both of these types of memories may include any suitable form of the computer-readable media described below. A Fixed Medium 1726 may also be coupled bi-directionally to the Processor 1722; it provides additional data storage capacity and may also include any of the computer-readable media described below. Fixed Medium

1726 may be used to store programs, data, and the like and is typically a secondary storage medium (such as a hard disk) that is slower than primary storage. It may be appreciated that the information retained within Fixed Medium 1726 may, in appropriate cases, be incorporated in standard fashion as virtual memory in Memory 1724. Removable Medium 1714 may take the form of any of the computer-readable media described below.

Processor 1722 is also coupled to a variety of input/output devices, such as Display 1704, Keyboard 1710, Mouse 1712 and Speakers 1730. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, motion sensors, brain wave readers, or other computers. Processor 1722 optionally may be coupled to another computer or telecommunications network using Network Interface 1740. With such a Network Interface 1740, it is contemplated that the Processor 1722 might receive information from the network, or might output information to the network in the course of performing the above-described portal deployment. Furthermore, method embodiments of the present invention may execute solely upon Processor 1722 or may execute over a network such as the Internet in conjunction with a remote CPU that shares a portion of the processing.

Software is typically stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory in this disclosure. Even when software is moved to the memory for execution, the processor may typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

In operation, the computer system 1700 can be controlled by operating system software that includes a file management system, such as a medium operating system. One example of operating system software with associated file management system software is the family of operating systems known as Windows® from Microsoft Corporation of Redmond, Washington, and their associated file management systems. Another example of operating system software with its associated file management system software is the Linux operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is, here and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems may appear from the description below. In addition, the techniques are not described with reference to any particular programming language, and various embodiments may, thus, be implemented using a variety of programming languages.

In alternative embodiments, the machine operates as a standalone device or may be connected (e.g., networked) to other machines. In a networked deployment, the machine may operate in the capacity of a server or a client machine in a client-server network environment or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, Glasses with a processor, Headphones with a processor, Virtual Reality devices, a processor, distributed processors working together, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies of the presently disclosed technique and innovation.

In general, the routines executed to implement the embodiments of the disclosure may be implemented as part of an operating system or a specific application, component, program, object, module or sequence of instructions referred to as "computer programs." The computer programs typically comprise one or more instructions set at various times in various memory and storage devices in a computer (or distributed across computers), and when read and executed by one or more processing units or processors in a computer (or across computers), cause the computer(s) to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution While this invention has been described in terms of several embodiments, there are alterations, modifications, permutations, and substitute equivalents, which fall within the scope of this invention. Although sub-section titles have been provided to aid in the description of the invention, these titles are merely illustrative and are not intended to limit the scope of the present invention. It should also be noted that there are many alternative ways of implementing the methods and apparatuses of the present invention. It is therefore intended that the following appended claims be interpreted as including all such alterations, modifications, permutations, and substitute equivalents as fall within the true spirit and scope of the present invention.

What is claimed is:

1. A method for deploying a secure portal between two virtual worlds comprising:
rendering a top cell for a first virtual world, wherein the rendering includes a transparent region overlapping a portal;
layering an intermediate cell underneath the top cell, wherein the intermediate cell comprises the portal;
receiving a message from the top cell comprising a minimum rendering size, shape and at least one transform;
transferring the message to a bottom cell for a second virtual world;
rendering a portion of the second world responsive to the message; and
layering the top cell, the intermediate cell and the bottom cell to generate a scene.

2. The method of claim 1, wherein the portion of the second world is the same size as the minimum rendering size.

3. The method of claim 1, wherein the intermediate cell is transparent.

4. The method of claim 1, wherein the cells are iFrames.

5. The method of claim 1, wherein the cells are separate applications.

6. The method of claim 1, wherein the first virtual world is a user's location.

7. The method of claim 6, further comprising receiving an input from the user to interact with the portal.

8. The method of claim 7, wherein the interacting is one of selecting the portal or causing an avatar to travel through the portal.

9. The method of claim 1, further comprising reordering the top and bottom cell responsive to the interacting.

10. The method of claim 1, wherein the at least one transform is generated based upon the view of a user.

11. A computer program product stored on non-transitory computer medium which, when executed by a computer system, performs the steps of:
rendering a top cell for a first virtual world, wherein the rendering includes a transparent region overlapping a portal;
layering an intermediate cell underneath the top cell, wherein the intermediate cell comprises the portal;
receiving a message from the top cell comprising a minimum rendering size, shape and at least one transform;
transferring the message to a bottom cell for a second virtual world;
rendering a portion of the second world responsive to the message; and

layering the top cell, the intermediate cell and the bottom
cell to generate a scene.

12. The computer program product of claim 11, wherein
the portion of the second world is the same size as the
minimum rendering size.

13. The computer program product of claim 11, wherein
the intermediate cell is transparent.

14. The computer program product of claim 11, wherein
the cells are iFrames.

15. The computer program product of claim 11, wherein
the cells are separate applications.

16. The computer program product of claim 11, wherein
the first virtual world is a user's location.

17. The computer program product of claim 16, when
executed by the computer system further performs the step
of receiving an input from the user to interact with the portal.

18. The computer program product of claim 17, wherein
the interacting is one of selecting the portal or causing an
avatar to travel through the portal.

19. The computer program product of claim 11, when
executed by the computer system further performs the step
of reordering the top and bottom cell responsive to the
interacting.

20. The computer program product of claim 11, wherein
the at least one transform is generated based upon the view
of a user.

\* \* \* \* \*